US009414325B2

(12) United States Patent
Zhang et al.

(10) Patent No.: US 9,414,325 B2
(45) Date of Patent: Aug. 9, 2016

(54) PATH LOSS COMPENSATION METHOD, BASE STATION AND USER EQUIPMENT

(71) Applicant: HUAWEI TECHNOLOGIES CO., LTD., Shenzhen, Guangdong (CN)

(72) Inventors: Jiayin Zhang, Shanghai (CN); Yongming Liang, Shanghai (CN); Wei Ni, Shenzhen (CN); Mingyu Zhou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 205 days.

(21) Appl. No.: 14/092,434

(22) Filed: Nov. 27, 2013

(65) Prior Publication Data

US 2014/0087782 A1 Mar. 27, 2014

Related U.S. Application Data

(63) Continuation of application No. PCT/CN2012/076336, filed on May 31, 2012.

(30) Foreign Application Priority Data

May 31, 2011 (CN) .......................... 2011 1 0144777

(51) Int. Cl.
H04B 1/00 (2006.01)
H04B 17/00 (2015.01)
(Continued)

(52) U.S. Cl.
CPC .......... *H04W 52/242* (2013.01); *H04W 52/146* (2013.01); *H04W 52/247* (2013.01); *H04W 52/40* (2013.01)

(58) Field of Classification Search
CPC ..................................................... H04W 52/24

USPC .......................... 455/522, 69, 127.1; 370/252
See application file for complete search history.

(56) References Cited

U.S. PATENT DOCUMENTS 6,101,176 A * 8/2000 Honkasalo et al. ........... 370/335
7,031,742 B2 * 4/2006 Chen ....................... H04B 7/022
                                                      375/130

(Continued)

FOREIGN PATENT DOCUMENTS

CN 101494895 A 7/2009
CN 102056178 A 5/2011

(Continued)

OTHER PUBLICATIONS

Extended European Search Report dated Mar. 20, 2014 in corresponding European Patent Application No. 12794076.5.

(Continued)

*Primary Examiner* — Tilahun B Gesesse
(74) *Attorney, Agent, or Firm* — Staas & Halsey LLP

(57) ABSTRACT

Embodiments of the present invention disclose a path loss compensation method, a base station, and a user equipment to implement calculation for path loss compensation. The method in an embodiment of the present invention includes: obtaining, by a base station, power parameters of a macro site and an RRH in a cell where a UE is located; calculating, by the base station, a path loss adjustment factor for the UE according to the power parameters, where the path loss adjustment factor is an adjustment parameter used by the base station to compensate for an uplink transmit power of the UE; and sending, by the base station, the path loss adjustment factor to the UE, so that the UE can calculate the uplink transmit power according to the path loss adjustment factor.

18 Claims, 7 Drawing Sheets

(51) Int. Cl.
*H04B 7/00* (2006.01)
*H04W 52/24* (2009.01)
*H04W 52/14* (2009.01)
*H04W 52/40* (2009.01)

(56) References Cited

U.S. PATENT DOCUMENTS

| | | | |
|---|---|---|---|
| 2007/0082620 A1 | 4/2007 | Zhang et al. ............... 455/69 | |
| 2007/0173279 A1* | 7/2007 | Kuroda ................ H04W 52/12 | |
| | | | 455/522 |
| 2008/0026744 A1* | 1/2008 | Frederiksen et al. ......... 455/425 | |
| 2008/0146154 A1* | 6/2008 | Claussen et al. ............ 455/63.1 | |
| 2008/0166976 A1* | 7/2008 | Rao ...................... H04W 52/10 | |
| | | | 455/69 |
| 2009/0170548 A1* | 7/2009 | Soliman ............... H04W 52/24 | |
| | | | 455/522 |
| 2010/0035647 A1* | 2/2010 | Gholmieh et al. ............ 455/522 | |
| 2010/0177721 A1* | 7/2010 | Simonsson ........... H04J 11/005 | |
| | | | 370/329 |
| 2010/0246705 A1* | 9/2010 | Shin ...................... H04W 52/42 | |
| | | | 375/267 |
| 2011/0039561 A1* | 2/2011 | Narasimha et al. ........... 455/436 | |
| 2011/0039569 A1* | 2/2011 | Narasimha et al. ........ 455/452.2 | |
| 2011/0171992 A1* | 7/2011 | Seo ...................... H04W 52/10 | |
| | | | 455/522 |
| 2011/0222416 A1* | 9/2011 | Damnjanovic ........ H04W 72/12 | |
| | | | 370/252 |
| 2011/0255515 A1* | 10/2011 | Maeda ................. H04W 36/18 | |
| | | | 370/331 |
| 2011/0281525 A1* | 11/2011 | Furuskar ............ H04B 17/0042 | |
| | | | 455/67.11 |
| 2012/0176998 A1* | 7/2012 | Muellner ............ H04W 52/343 | |
| | | | 370/329 |
| 2012/0202554 A1* | 8/2012 | Seo ..................... H04W 52/146 | |
| | | | 455/522 |
| 2012/0213092 A1* | 8/2012 | Sun et al. ..................... 370/248 | |
| 2013/0286997 A1* | 10/2013 | Davydov ............... H04B 7/024 | |
| | | | 370/329 |
| 2013/0302263 A1* | 11/2013 | Moriya .......................... 424/59 | |
| 2013/0310102 A1* | 11/2013 | Chao et al. .................... 455/522 | |

FOREIGN PATENT DOCUMENTS

| | | |
|---|---|---|
| CN | 102056218 A | 5/2011 |
| EP | 2503829 | 9/2012 |
| WO | 03/036816 A1 | 5/2003 |
| WO | 2010/098593 | 9/2010 |
| WO | 2011/060741 | 5/2011 |

OTHER PUBLICATIONS

"Uplink Power Control Considerations for CoMP", Alcatel-Lucent Shanghai Bell, Alcatel-Lucent, 6.3.1.3, 3GPP TSG RAN WG1 Meeting RAN1#65, Barcelona, Spain, May 2011.
*3$^{rd}$ Generation Partnership Project; Technical Specification Group Radio Access Network; Evolved Universal Terrestrial Radio Access (E-UTRA); Physical layer procedures (Release 10).* Technical Specification: 3GPP TS 36.213 V10.1.0 (Mar. 2011). Valbonne, France: 3$^{rd}$ Generation Partnership Project. 2011. pp. 1-115.
International Search Report issued Sep. 13, 2012, in corresponding International Patent Application No. PCT/CN2012/076336.
International Search Report, dated Sep. 13, 2012, in corresponding International Application No. PCT/CN2012/076336 (4 pp.).
Chinese Office Action dated Jun. 5, 2014 in corresponding Chinese Patent Application No. 201110144777.1.

* cited by examiner

PATH LOSS COMPENSATION METHOD, BASE STATION AND USER EQUIPMENT

CROSS REFERENCE

This application is a continuation of International Application No. PCT/CN2012/076336, filed on May 31, 2012, which claims priority to Chinese Patent Application No. 201110144777.1, filed on May 31, 2011, both of which are hereby incorporated by reference in their entireties.

TECHNICAL FIELD

Embodiments of the present invention relate to the field of network communications technologies, and in particular, to a path loss compensation method, a base station, and a user equipment.

BACKGROUND

On the 63rd session of the 3rd Generation Partnership Project (3GPP, 3rd Generation Partnership Project) Radio Access Network (RAN, Radio Access Network) 1, four scenarios of Coordinated Multi-Point transmission (CoMP, Coordinated Multi-Point) were defined. The fourth scenario is that power transmission points including a macro site (Macro Site) and a remote radio head (RRH, Remote Radio Head) in a macro site region share one cell identity (Cell Identity). This architecture is also called a distributed antenna system (DAS, Distributed Antenna System).

In uplink transmission of a DAS system, in order that powers received at a base station (eNB, evolved Node B) from different user equipments (UE, User Equipment) are on roughly the same level to avoid inter-UE interference caused by a near-far effect, uplink power control is generally applied to the UEs. In the Long Term Evolution (LTE, Long Term Evolution) R-10 standard, the transmit power of a physical uplink shared channel (PUSCH, Physical Uplink Shared Channel), a physical uplink control channel (PUCCH, Physical Uplink Control Channel), and a sounding reference signal (SRS, Sounding Reference Signal) is decided by path loss (PL, Path Loss) estimated by a UE, as expressed by the following formula:

$$PL_c = \text{referenceSignalPower} - RSRP$$

where, referenceSignalPower is a reference signal power defined by a base station, and is obtained by the UE through cell-specific (cell specific) high layer signaling, and RSRP is a reference signal received power measured by the UE at common reference signal (CRS, Common Reference Signal) Port 0 or Port 1.

However, the actual receiving point in the uplink may be inconsistent with the actual receiving point in the downlink. Therefore, the path loss also differs. The PL calculation method in the prior art supports only path loss calculation for one power transmission point, and is not accurate when the UE uses the path loss to control the uplink transmit power.

SUMMARY

Embodiments of the present invention provide a path loss compensation method, a base station, and user equipment to implement calculation for path loss compensation where there are multiple power transmission points, which support a macro site and an RRH that flexibly participate in uplink coordinated reception, and improve accuracy of a UE in calculating uplink transmit power.

In one aspect, a path loss compensation method is provided, including:

obtaining, by a base station, power parameters of a macro site and an RRH in a cell where a UE is located;

calculating, by the base station, a path loss adjustment factor for the UE according to the power parameters, where the path loss adjustment factor is an adjustment parameter used by the base station to compensate for an uplink transmit power of the UE; and sending, by the base station, the path loss adjustment factor to the UE, so that the UE can calculate the uplink transmit power according to the path loss adjustment factor.

In another aspect, another path loss compensation method is provided, including:

receiving, by a UE, a path loss adjustment factor sent by a base station, where the path loss adjustment factor is an adjustment parameter used by the base station to compensate for an uplink transmit power of the UE; and obtaining, by the UE, a reference signal power selected by the base station, where the reference signal power is any one transmit power selected by the base station among transmit powers of a macro site and an RRH in a cell where the UE is located;

measuring, by the UE, a reference signal received power; and calculating, by the UE, the uplink transmit power according to the path loss adjustment factor, the reference signal power, and the reference signal received power.

In another aspect, a base station is provided, including:

an obtaining unit, configured to obtain power parameters of a macro site and an RRH in a cell where a UE is located;

a calculating unit, configured to calculate a path loss adjustment factor for the UE according to the power parameters obtained by the obtaining unit, where the path loss adjustment factor is an adjustment parameter used by the base station to compensate for an uplink transmit power of the UE; and a sending unit, configured to send the path loss adjustment factor calculated by the calculating unit to the UE, so that the UE can calculate the uplink transmit power according to the path loss adjustment factor.

In another aspect, a user equipment is provided, including:

a receiving unit, configured to receive a path loss adjustment factor sent by a base station, where the path loss adjustment factor is an adjustment parameter used by the base station to compensate for an uplink transmit power of the UE; and an obtaining unit, configured to obtain a reference signal power selected by the base station, where the reference signal power is any one transmit power selected by the base station among transmit powers of a macro site and an RRH in a cell where the UE is located;

a measuring unit, configured to measure a reference signal received power; and a power calculating unit, configured to calculate uplink transmit power according to the path loss adjustment factor received by the receiving unit, the reference signal power obtained by the reference signal power obtaining unit, and the reference signal received power measured by the measuring unit.

As seen from the foregoing technical solutions, the embodiments of the present invention have the following advantages:

In the embodiments of the present invention, a base station calculates a path loss adjustment factor for a UE in a cell, and sends it to the UE. Because the path loss adjustment factor is calculated by the base station according to obtained power parameters of a macro site and an RRH in the cell where the UE is located, when the UE calculates an uplink transmit power according to the path loss adjustment factor, the UE can implement calculation for path loss compensation where there are multiple power transmission points. In addition, the range of the macro site and the RRH, from which the base station obtains the power parameters, can be set according to an actual need. Thereby, the embodiments of the present invention support a macro site and an RRH that flexibly participate in uplink coordinated reception, and improve the accuracy of the UE in calculating the uplink transmit power.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following descriptions show merely some embodiments of the present invention, and a person of ordinary skill in the art may still derive other drawings from these accompanying drawings.

DESCRIPTION OF EMBODIMENTS

Embodiments of the present invention provide a path loss compensation method, a base station, and user equipment to implement calculation for path loss compensation where there are multiple power transmission points, which support a macro site and an RRH that flexibly participate in uplink coordinated reception, and improve accuracy of a UE in calculating uplink transmit power.

To make the objectives, features and advantages of the present invention more evident and comprehensible, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiment of the present invention shall fall within the protection scope of the present invention.

Figure 1:
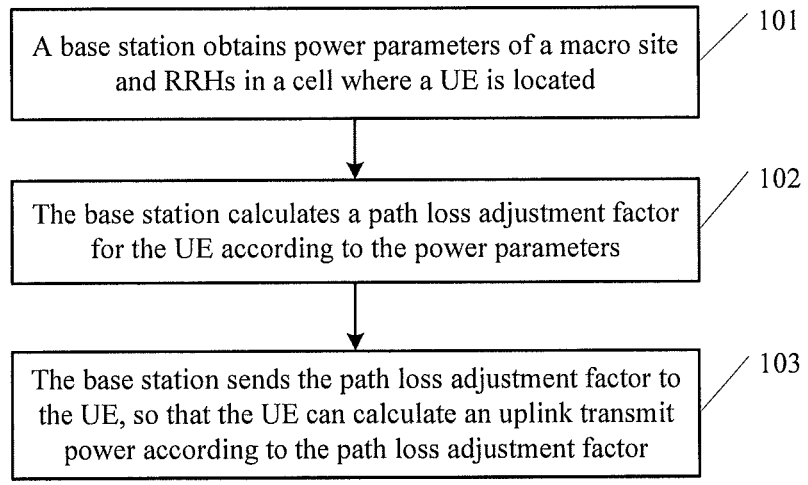
FIG. 1 is a schematic diagram of a path loss compensation method according to an embodiment of the present invention.

As shown in FIG. 1, a path loss compensation method provided in an embodiment of the present invention includes the following:

101. A base station obtains power parameters of a macro site and an RRH in a cell where a UE is located.

In the embodiment of the present invention, power transmission points may specifically be one or more of a macro site and an RRH in the cell where the UE is located. Optionally, the macro site and RRH power parameters obtained by the base station may include: transmit power and received power of the macro site, and transmit powers and received powers of the RRH. However, the content of the power parameters is not limited to what is enumerated herein.

It should be noted that, in an alternative implementation mode in the embodiment of the present invention, the method further includes: obtaining, by the base station, a transmit power and a reference signal received power of the UE in addition to the power parameters of the macro site and the RRH. However, the examples given herein shall not be construed as a limitation.

102. The base station calculates a path loss adjustment factor for the UE according to the power parameters.

The path loss adjustment factor is an adjustment parameter used by the base station to compensate for the uplink transmit power of the UE. However, in the prior art, a base station does not intervene in compensation for the uplink transmit power of a UE. In the embodiment of the present invention, the compensation for the uplink transmit power of a UE is implemented by using a path loss adjustment factor based on multiple power transmission points that is calculated by a base station.

103. The base station sends the path loss adjustment factor to the UE, so that the UE can calculate an uplink transmit power according to the path loss adjustment factor.

In step 102, after calculating the path loss adjustment factor for the UE, the base station sends the calculated path loss adjustment factor to the UE, so that the UE can calculate the uplink transmit power according to the path loss adjustment factor.

In the embodiment of the present invention, a base station calculates a path loss adjustment factor for a UE in a cell, and sends it to the UE. Because the path loss adjustment factor is calculated by the base station according to obtained power parameters of a macro site and an RRH in the cell where the UE is located, when the UE calculates an uplink transmit power according to the path loss adjustment factor, the UE can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Figure 2:
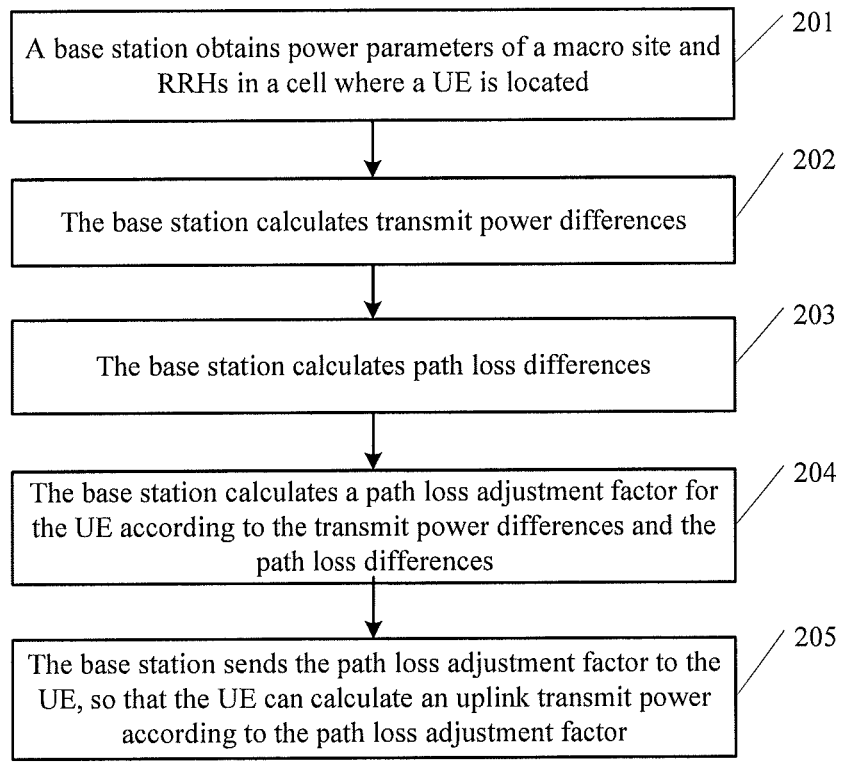
FIG. 2 is a schematic diagram of another path loss compensation method according to an embodiment of the present invention.

The following uses a specific embodiment to describe a path loss compensation method in the present invention. As shown in FIG. 2, the method includes the following:

201. A base station obtains power parameters of a macro site and an RRH in a cell where a UE is located.

In the embodiment of the present invention, the power parameters obtained by the base station include: transmit powers of the macro site and the RRH, a reference signal power, and received powers of the macro site and the RRH, where the reference signal power is any one transmit power among the transmit powers of the macro site and the RRH; In the embodiment of the present invention, the reference signal power may be selected randomly. Either the transmit power of a macro site or the transmit power of any one of all RRHs sharing the same cell ID may be selected as the reference signal power. No limitation is imposed herein. It should be noted that the content of the power parameters obtained by the base station is merely a practicable implementation mode.

202. The base station calculates transmit power differences.

The transmit power differences are differences between each of the transmit powers of the macro site and the RRH and the reference signal power. That is, if the number of the macro site plus RRHs is N, it is necessary to calculate N transmit power difference values in total.

203. The base station calculates path loss differences.

The path loss differences are path losses obtained by subtracting path losses between the UE and each of the macro site and the RRH in the cell where the UE is located from a path loss between the UE in the cell and the macro site or the RRH that sends the reference signal power. If the number of the macro site plus RRH is N, it is necessary to calculate N path loss difference values in total. The path losses between each of the UE and the macro site and the RRH are path losses obtained by subtracting the received powers of each of the macro site and the RRH in the cell where the UE is located from the transmit power of the UE.

It should be noted that there is no definite order of implementation between steps 202 and 203; step 202 may be implemented before step 203, or step 203 may be implemented before step 202, or step 202 and step 203 are implemented simultaneously, which is not limited herein.

204. The base station calculates the path loss adjustment factor for the UE according to the transmit power differences and the path loss differences.

In the embodiment of the present invention, the path loss adjustment factor is decided by the transmit power differences and the path loss differences. In practical applications, the composition of the path loss adjustment factor is diverse, and will be detailed in subsequent embodiments.

205. The base station sends the path loss adjustment factor to the UE, so that the UE can calculate an uplink transmit power according to the path loss adjustment factor.

In step 204, after calculating the path loss adjustment factor, the base station sends the path loss adjustment factor to the UE, so that the UE can calculate the uplink transmit power according to the path loss adjustment factor.

In the embodiment of the present invention, a base station calculates a path loss adjustment factor for a UE in a cell, and sends it to the UE. Because the path loss adjustment factor is decided by transmit power differences and path loss differences, when the UE calculates an uplink transmit power according to the path loss adjustment factor, the UE can implement calculation for path loss compensation where there are multiple power transmission points. In addition, the range of the macro site and the RRH, from which the base station obtains power parameters, can be set according to an actual need. Thereby, the embodiment of the present invention supports a macro site and an RRH that flexibly participate in uplink coordinated reception, and improves the accuracy of the UE in calculating the uplink transmit power.

Figure 3:
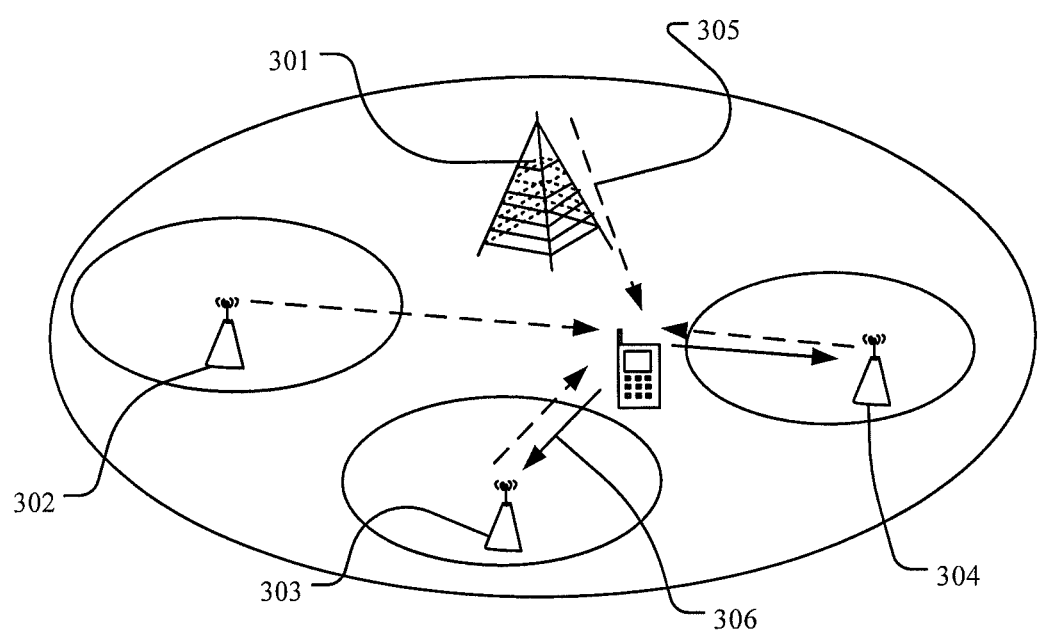
FIG. 3 is a schematic diagram of coordinated communication of a macro site and an RRH in a heterogeneous network.

The following describes an actual application scenario in an embodiment of the present invention. FIG. 3 is a schematic diagram of coordinated communication of a macro site and an RRH in a heterogeneous network. Assuming that a PUSCH is employed in the uplink, power transmission points that are in a region of a macro site and share the same cell ID include a macro site 301 whose transmit power is 46 dBm and RRH 1, RRH 2, and RRH 3 whose transmit power is 30 dBm. As shown in FIG. 3, RRH 1 is 302, RRH 2 is 303, RRH 3 is 304, 305 indicates participation in downlink coordination, and 306 indicates participation in uplink coordinated reception. The macro site and RRH 1, RRH 2, and RRH 3 all participate in downlink transmission, but in the uplink, only RRH 2 and RRH 3 participate in PUSCH transmission. In the network architecture here, if all RRHs and the macro site use CRS Port 0 to transmit at the maximum upper-limit power, the RSRP measured by the UE is:

$$RSRP = 10 \log_{10}\left(\sum_{i=0}^{N-1} 10^{\frac{(P_i - PL_i)}{10}}\right)$$

where, N is the number of the macro site and the RRH, Pi is the transmit power of the $i^{th}$ macro site or RRH, $PL_i$ is a path loss between the UE and the macro site or RRH whose transmit power is Pi, the unit of Pi is dBm, and the unit of $PL_i$ is dB.

The base station obtains the transmit power difference $\alpha_i$:

$$\alpha_i = P_i - P_0, \alpha_0 = 0,$$

where, P0 is a reference signal power, and may be a transmit power of any one of the macro site and the RRH, and Pi is the transmit power of the $i^{th}$ macro site or RRH; in the uplink, the base station may use SRS, PUCCH, PUSCH or other modes to obtain received power differences between the reference signal received power and the received powers of the macro site and the RRH.

The base station obtains the path loss difference $\beta_i$:

$$\beta_i = PL_0 - PL_i, \beta_0 = 0,$$

where, $PL_0$ is a path loss between the UE and the macro site or RRH whose reference signal power is P0; and $PL_1$ is a path loss between the UE and the macro site or RRH whose transmit power is Pi.

From the formulas of $\alpha_i$ and $\beta_i$, it is deduced that $P_i - PL_i = \alpha_i + \beta_i + P_0 - PL_0$.

$P_i - PL_i$ is substituted into the above formula to obtain the RSRP:

$$RSRP = 10 \log_{10}\left(\sum_{i=0}^{N-1} 10^{\frac{(P_i - PL_i)}{10}}\right) = 10 \log_{10}\left(\sum_{i=0}^{N-1} 10^{\frac{(\alpha_i - \beta_i)}{10}}\right) + P_0 - PL_0$$

from which it is deduced that:

$$PL_0 = 10 \log_{10}\left(\sum_{i=0}^{N-1} 10^{\frac{(P_i - PL_i)}{10}}\right) = 10 \log_{10}\left(\sum_{i=0}^{N-1} 10^{\frac{(\alpha_i - \beta_i)}{10}}\right) + P_0 - RSRP$$

R represents a set of a macro site and an RRH actually participating in the uplink coordinated reception. According to the definition of the target path loss $PL_c$ calculated by the UE, it is deduced that:

$$PL_c = -10 \log_{10}\left(\sum_{i \in R} 10^{-\frac{PL_i}{10}}\right)$$

By substituting the formula $PL_i = PL_0 - \beta_i$ into the above formula, it is deduced that:

$$PL_c = -10 \log_{10}\left(\sum_{i \in R} 10^{-\frac{PL_0 - \beta_i}{10}}\right) = PL_0 - 10 \log_{10}\left(\sum_{i \in R} 10^{\frac{\beta_i}{10}}\right)$$

By substituting the formula $$PL_0 = 10 \log_{10}\left(\sum_{i=0}^{N-1} 10^{\frac{(P_i - PL_i)}{10}}\right) = 10 \log_{10}\left(\sum_{i=0}^{N-1} 10^{\frac{(\alpha_i - \beta_i)}{10}}\right) + P_0 - RSRP$$

into the above formula, it is deduced that:

$$PL_c = P_0 + 10 \log_{10}\left(\sum_{i=0}^{N-1} 10^{\frac{(\alpha_i - \beta_i)}{10}}\right) \bigg/ \sum_{i \in R} 10^{\frac{\beta_i}{10}} - RSRP$$

Therefore, the path loss adjustment factor calculated by the base station is $$PA = \left(\sum_{i=0}^{N-1} 10^{\frac{(\alpha_i - \beta_i)}{10}}\right) \bigg/ \sum_{i \in R} 10^{\frac{\beta_i}{10}}$$

Optionally, when all the macro site and the RRH actually participate in uplink coordinated reception, R={0, 1, ..., N−1}, and the path loss adjustment factor is $$PA = \left(\sum_{i=0}^{N-1} 10^{\frac{(\alpha_i - \beta_i)}{10}}\right) \bigg/ \sum_{i=0}^{N-1} 10^{\frac{\beta_i}{10}}$$

When the reference signal power P0 is the transmit power of the macro site, because the transmit power P0 of the macro site is greater than the transmit power of each RRH, $\alpha_i \leq 0$; moreover, when all the macro site and the RRH actually participate in the uplink coordinated reception, a value range of the path loss adjustment factor PA is from 0 to 1. If only some of the RRHs participate in the uplink coordinated reception, the denominator may be less than the numerator, and therefore, the value of PA may be greater than 1.

The base station sends the path loss adjustment factor PA to the UE, so that the UE can calculate an uplink transmit power according to the path loss adjustment factor PA. After the path loss adjustment factor PA is deduced inversely, the PA is sent to the UE, so that the UE can calculate the uplink transmit power according to the path loss adjustment factor PA.

Figure 4:
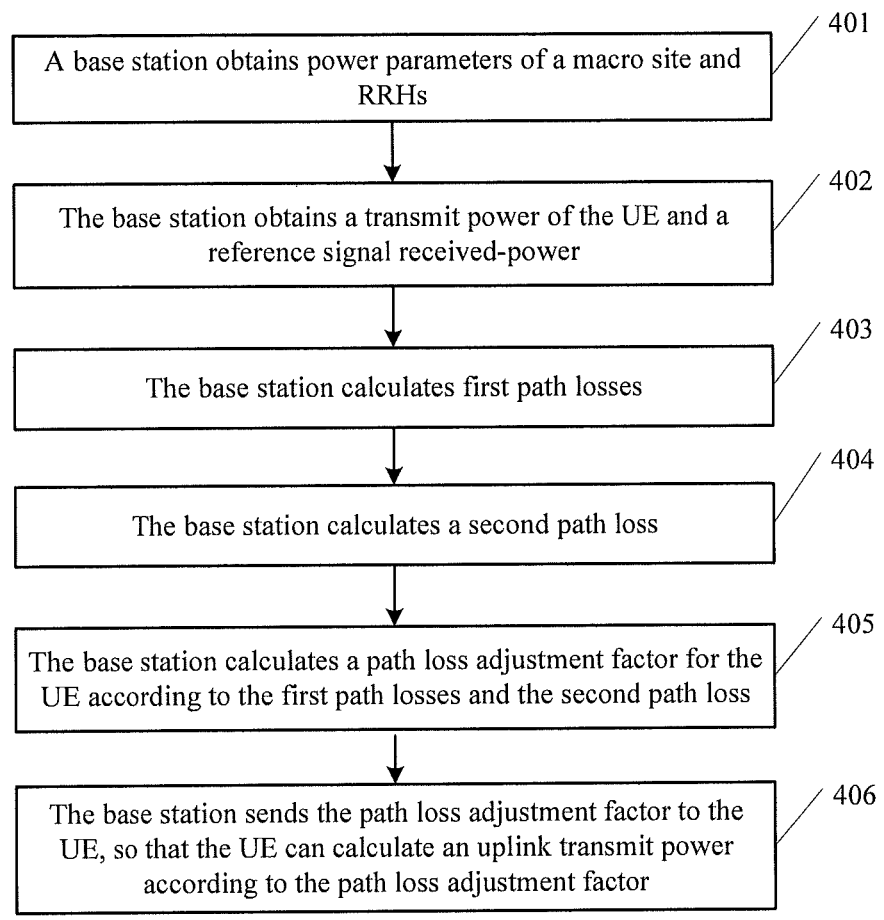
FIG. 4 is a schematic diagram of another path loss compensation method according to an embodiment of the present invention.

The following uses another specific embodiment to describe a path loss compensation method in the present invention. As shown in FIG. 4, the method includes the following:

401. A base station obtains power parameters of a macro site and an RRH.

In the embodiment of the present invention, the power parameters obtained by the base station include: transmit powers of the macro site and the RRH, a reference signal power, and received powers of the macro site and the RRH, where the reference signal power is any one transmit power among the transmit powers of the macro site and the RRH.

402. The base station obtains a transmit power of the UE and a reference signal received power.

In the embodiment of the present invention, the base station obtains the transmit power of the UE and the reference signal received power, which may be implemented in different manners in practical applications. An optional manner is: the base station may add a get field in interaction signaling between the base station and the UE; and another optional manner is: the base station may send query signaling to the UE, where the query signaling specifies that the base station needs to obtain the transmit power of the UE and the reference signal received power. Nevertheless, the base station may obtain the powers in other manners, and the manners are not limited herein. It should be noted that, in the embodiment of the present invention, there is no definite order of implementation between step 401 and step 402; step 401 may be implemented before step 402, or step 402 may be implemented before step 401, or step 401 and step 402 are implemented simultaneously, which is not limited herein.

403. The base station calculates first path losses.

The first path losses are path losses obtained by subtracting the received powers of each of the macro site and the RRH from the transmit power of the UE.

404. The base station calculates a second path loss.

The second path loss is a result of subtracting the reference signal received power from the reference signal power.

It should be noted that step 403 and step 404 are not order-sensitive.

405. The base station calculates a path loss adjustment factor for the UE according to the first path losses and the second path loss.

In the embodiment of the present invention, the path loss adjustment factor is decided by the first path losses and the second path loss. In practical applications, the composition of the path loss adjustment factor is diverse, and will be detailed in subsequent embodiments.

406. The base station sends the path loss adjustment factor to the UE, so that the UE can calculate the uplink transmit power according to the path loss adjustment factor.

In the embodiment of the present invention, a base station calculates a path loss adjustment factor for a UE in a cell, and sends it to the UE. Because the path loss adjustment factor is decided by first path losses and a second path loss, when the UE calculates an uplink transmit power according to the path loss adjustment factor, the UE can implement calculation for path loss compensation where there are multiple power transmission points. In addition, the range of the macro site and the RRH, from which the base station obtains power parameters, can be set according to an actual need. Thereby, the embodiment of the present invention supports a macro site and an RRH that flexibly participate in uplink coordinated reception, and improves the accuracy of the UE in calculating the uplink transmit power.

The following describes another practical application scenario:

First, the base station obtains the transmit power Pc of the UE, and the received power Pri of the $i^{th}$ macro site or RRH.

Then, the base station obtains the reference signal power P0 and the reference signal received power RSRP.

The base station calculates first path losses PLi=Pc−Pri.

The base station calculates a second path loss PL0=P0−RSRP.

The base station calculates a path loss adjustment factor PA for the UE according to the first path losses and the second path loss to obtain:

$$PA = 10^{\frac{(\sum_{i \in R} PL_i) - PL_0}{10}}$$

where, R is a set of a macro site and an RRH that actually participate in uplink coordinated reception.

Figure 5:
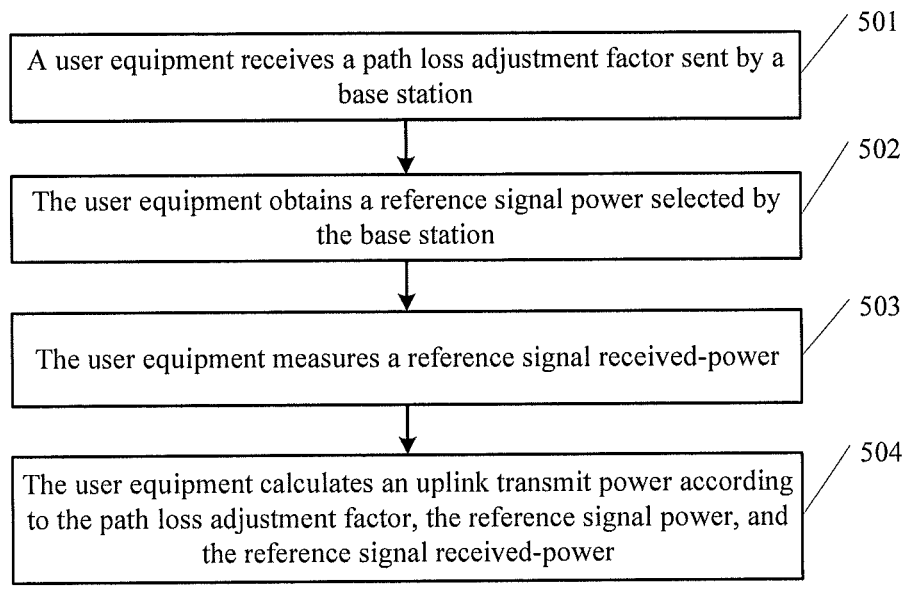
FIG. 5 is a schematic diagram of another path loss compensation method according to an embodiment of the present invention.

The above embodiment describes the path loss compensation method implemented on the base station side, and the present invention further provides a path loss compensation method implemented on the user equipment side. As shown in FIG. 5, a path loss compensation method includes the following:

501. A user equipment receives a path loss adjustment factor sent by a base station.

The path loss adjustment factor is an adjustment parameter used by the base station to compensate for an uplink transmit power of a UE. In practical applications, the path loss adjustment factor calculated by the base station may be expressed in many manners. For the UE, the path loss compensation factor is calculated by the base station and sent to the UE.

502. The user equipment obtains a reference signal power selected by the base station.

The reference signal power is any one transmit power selected by the base station among transmit powers of a macro site and an RRH in a cell where the UE is located. In practical applications, the UE obtains the reference signal power selected by the base station, which may be implemented in different manners. An optional manner is: the UE may add a get field in interaction signaling between the base station and the UE; and another optional manner is: the UE may send query signaling to the base station, where the query signaling specifies that the UE needs to obtain the reference signal power selected by the base station. Nevertheless, the UE may obtain the powers in other manners, and the manners are not limited herein.

503. The user equipment measures a reference signal received power.

The reference signal received power is measured by the UE directly. In practical applications, the UE may measure the reference signal received power by using common reference signal port 0 or port 1.

504. The user equipment calculates an uplink transmit power according to the path loss adjustment factor, the reference signal power, and the reference signal received power.

After receiving the path loss adjustment factor sent by the base station, the UE can calculate the uplink transmit power according to the path loss adjustment factor, the reference signal power, and the reference signal received power. In practical applications, there may be various manners for power control. For example, when an SRS mode, a PUCCH mode, a PUSCH mode or another mode is used, the manner of transmit power control is different.

In the embodiment of the present invention, the user equipment receives a path loss adjustment factor calculated by a base station for the UE in a cell. Because the path loss adjustment factor is calculated by the base station according to obtained power parameters of a macro site and an RRH, when the UE calculates an uplink transmit power according to the path loss adjustment factor, the UE can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Hereinafter, an embodiment of a path loss compensation method implemented on the user equipment side is described. It is assumed that the path loss adjustment factor PA sent by the base station to the UE is:

$$PA = \left( \sum_{i=0}^{N-1} 10^{\frac{(\alpha_i - \beta_i)}{10}} \right) \Big/ \sum_{i \in R} 10^{\frac{\beta_i}{10}}$$

The transmit power difference is $\alpha_i$, where $\alpha_i = P_i - P_0$, $\alpha_0 = 0$, P0 is a reference signal power, and Pi is the transmit power of an $i^{th}$ macro site or RRH; the path loss difference is $\beta_i$, where $\beta_i = PL_0 - PL_i$, $\beta_0 = 0$, $PL_0$ is a path loss between the UE and the macro site or RRH whose reference signal power is P0, and $PL_i$ is a path loss between the UE and the micro site or RRH whose transmit power is Pi; N is the number of the macro site and the RRH, and R is a set of a macro site and an RRH that actually participate in uplink coordinated reception.

Or, the path loss adjustment factor PA sent by the base station to the UE is:

$$PA = 10^{\frac{(\sum_{i \in R} PL_i) - PL_0}{10}}$$

where, R is a set of a macro site and an RRH that actually participate in uplink coordinated reception, and the first path loss calculated by the base station is $PL_i = P_c - P_{ri}$; the second path loss calculated by the base station is $PL_0 = P_0 - RSRP$; the base station obtains the transmit power Pc of the UE, and the received power Pri of the $i^{th}$ macro site or RRH; and the base station obtains the reference signal power P0 and the reference signal received power RSRP.

After receiving the PA, the UE obtains the reference signal power referenceSignalPower selected by the base station.

The UE measures the reference signal received power RSRP.

The target path loss $PL_c$ calculated by the UE may be $PL_c = \text{referenceSignalPower} + 10 \log_{10}(PA) - RSRP$.

When the UE uses PUSCH mode, PUCCH mode, or SRS mode that will be described below, a value range of the PA varies.

In an application scenario, by substituting $PL_c$ into the uplink transmit power formula applied when the UE uses PUSCH mode, it is deduced that:

$$P_{PUSCH}(i) = \min \left\{ \begin{array}{l} P_{CMAX}, \\ 10 \log_{10}(M_{PUSCH}(i)) + P_{O\_PUSCH}(j) + \alpha(j) \cdot PL_C + \Delta_{TF}(i) + f(i) \end{array} \right\}$$

where, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, $\Delta_{TF}(i)$ is a power offset based on a modulation and coding scheme and a data type, and $f(i)$ represents a closed-loop adjustment part of power control.

In another application scenario, by substituting $PL_c$ into the uplink transmit power formula applied when the UE uses PUCCH mode, it is deduced that:

$$P_{PUCCH}(i) = \min \begin{cases} P_{CMAX}, \\ P_{0\_PUCCH} + PL_C + h(n_{CQI}, n_{HARQ}, n_{SR}) + \Delta_{F\_PUCCH}(F) + \Delta_{TxD}(F') + g(i) \end{cases}$$

where, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a power deviation of PUCCH format F relative to PUCCH format 1a, $\Delta_{TxD}(F')$ is a power deviation between PUCCHs transmitted on two antenna ports, and g(i) is a PUCCH power control adjustment state factor.

In another application scenario, by substituting $PL_c$ into the uplink transmit power formula applied when the UE uses an SRS mode, it is deduced that:

$$P_{SRS}(i) = \min \begin{cases} P_{CMAX}, \\ P_{SRS\_OFFSET} + 10\log_{10}(M_{SRS}) + P_{O\_PUSCH}(j) + \alpha(j) \cdot PL_C + f(i) \end{cases}$$

where, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, and f(i) represents a closed-loop adjustment part of power control.

It should be noted that the above three different application scenarios depend on the transmission mode selected by the UE.

Hereinafter, another specific embodiment of a path loss compensation method implemented on the user equipment side is described. It is assumed that the path loss adjustment factor sent by the base station to the UE is PA. The content of the PA may be the same as that in the preceding embodiment, and is not detailed here any further.

After the UE receives the PA sent by the base station;

The UE obtains a reference signal power referenceSignalPower selected by the base station;

The UE measures the reference signal received power RSRP;

The UE calculates a target path loss $PL_c$:

$PL_c$=referenceSignalPower−RSRP.

In an application scenario, the UE calculates the uplink transmit power of a PUSCH according to the following formula:

$$P_{PUSCH}(i) = \min \begin{cases} P_{CMAX}, \\ 10\log_{10}(M_{PUSCH}(i)) + P_{O\_PUSCH}(j) + \alpha(j) \cdot (PL_C + 10\log_{10}(PA)) + \Delta_{TF}(i) + f(i) \end{cases}$$

or, $$P_{PUSCH}(i) = \min \begin{cases} P_{CMAX}, \\ 10\log_{10}(M_{PUSCH}(i)) + P_{O\_PUSCH}(j) + \beta \cdot \alpha(j) \cdot PL_C + \Delta_{TF}(i) + f(i) \end{cases},$$

$\beta = (PL_C + 10\log_{10}(PA))/PL_C$ or, $$P_{PUSCH}(i) = \min \begin{cases} P_{CMAX}, \\ 10\log_{10}(M_{PUSCH}(i)) + P_{O\_PUSCH}(j) + \gamma \cdot PL_C + \Delta_{TF}(i) + f(i) \end{cases},$$

$\gamma = \alpha(j) \cdot (PL_C + 10\log_{10}(PA))/PL_C$ where, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, PA is the path loss adjustment factor, $\Delta_{TF}(i)$ is a power offset based on a modulation and coding scheme and a data type, and f(i) represents a closed-loop adjustment part of power control.

In an application scenario, the UE calculates the transmit power $P_{PUCCH}(i)$ of a PUCCH according to the following formula:

$$P_{PUCCH}(i) = \min \begin{cases} P_{CMAX}, \\ P_{0\_PUCCH} + PL_C + 10\log_{10}(PA) + h(n_{CQI}, n_{HARQ}, n_{SR}) + \Delta_{F\_PUCCH}(F) + \Delta_{TxD}(F') + g(i) \end{cases}$$

where, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, PA is the path loss adjustment factor, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{TxD}(F')$ is a value between PUCCHs transmitted on two antenna ports, and g(i) is a PUCCH power control adjustment state factor.

In an application scenario, the UE calculates the transmit power $P_{SRS}(i)$ of an SRS according to the following formula:

$$P_{SRS}(i) = \min\begin{cases} P_{CMAX}, \\ P_{SRS\_OFFSET} + 10\log_{10}(M_{SRS}) + P_{O\_PUSCH}(j) + \alpha(j) \cdot (PL_C + 10\log_{10}(PA)) + f(i) \end{cases}$$

or, $$P_{SRS}(i) = \min\begin{cases} P_{CMAX}, \\ P_{SRS\_OFFSET} + 10\log_{10}(M_{SRS}) + P_{O\_PUSCH}(j) + \beta \cdot \alpha(j) \cdot PL_C + f(i) \end{cases},$$

$$\beta = (PL_C + 10\log_{10}(PA))/PL_C$$

or, $$P_{SRS}(i) = \min\begin{cases} P_{CMAX}, \\ P_{SRS\_OFFSET} + 10\log_{10}(M_{SRS}) + P_{O\_PUSCH}(j) + \gamma \cdot PL_C + f(i) \end{cases},$$

$$\gamma = \alpha(j) \cdot (PL_C + 10\log_{10}(PA))/PL_C$$

where, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, PA is the path loss adjustment factor, and f(i) represents a closed-loop adjustment part of power control.

Figure 6:
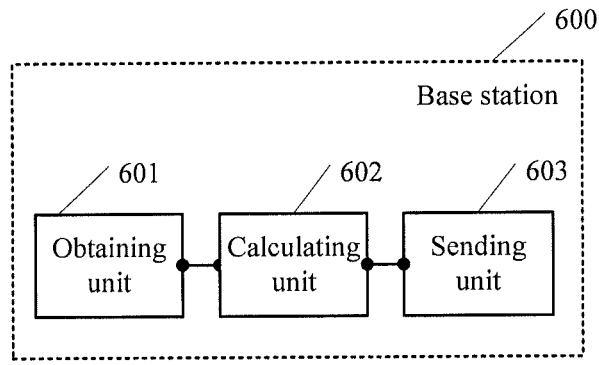
FIG. 6 is a schematic diagram of a base station according to an embodiment of the present invention.

The above embodiments have described the path loss compensation method. The following will describe corresponding apparatuses where the method is applied. As shown in FIG. 6, a base station provided in an embodiment of the present invention includes:

an obtaining unit 601, configured to obtain power parameters of a macro site and an RRH in a cell where a UE is located;

a calculating unit 602, configured to calculate a path loss adjustment factor for the UE according to the power parameters obtained by the obtaining unit 601, where the path loss adjustment factor is an adjustment parameter used by the base station to compensate for an uplink transmit power of the UE; and a sending unit 603, configured to send the path loss adjustment factor calculated by the calculating unit 602 to the UE, so that the UE can calculate the uplink transmit power according to the path loss adjustment factor.

It should be noted that, optionally, in the embodiment of the present invention, the obtaining unit 601 may be further configured to obtain a transmit power of the UE and a reference signal power.

The above embodiment merely describes a structural relationship between units/modules. For the execution method of each unit/module in practical applications, reference may be made to the method illustrated in FIG. 1, and no repeated description is given here.

In the embodiment of the present invention, the calculating unit 602 calculates a path loss adjustment factor for a UE in a cell, and sends it to the UE. Because the path loss adjustment factor is calculated by the base station according to obtained power parameters of a macro site and an RRH in the cell where the UE is located, when the UE calculates an uplink transmit power according to the path loss adjustment factor, the UE can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Figure 7:
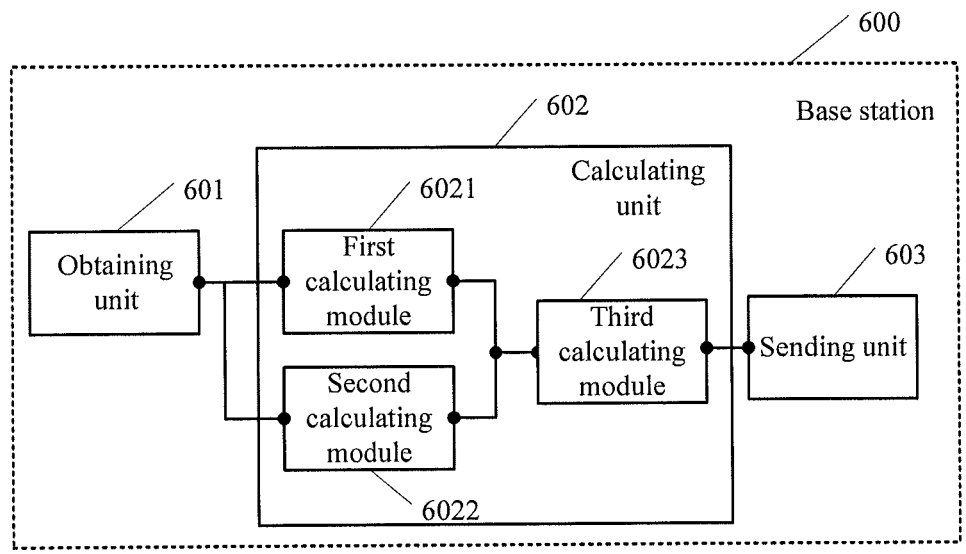
FIG. 7 is a schematic diagram of another base station according to an embodiment of the present invention.

The following uses a specific embodiment to describe the base station in the present invention. As shown in FIG. 7, the base station 600 includes: an obtaining unit 601, a calculating unit 602, and a sending unit 603.

The power parameters obtained by the obtaining unit 601 include: transmit powers of the macro site and the RRH, a reference signal power, and received powers of the macro site and the RRH, where the reference signal power is any one transmit power among the transmit powers of the macro site and the RRH;

The calculating unit 602 includes:

a first calculating module 6021, configured to calculate transmit power differences, where the transmit power differences are differences between each of the transmit powers of the macro site and the RRH and the reference signal power;

a second calculating module 6022, configured to calculate path loss differences, where the path loss differences are path losses obtained by subtracting path losses between the UE and each of the macro site and the RRH in the cell where the UE is located from a path loss between the UE and each of a macro site or RRH whose transmit power is selected as the reference signal power, where the path losses between the UE and each of the macro site and the RRH in the cell where the UE is located is path losses obtained by subtracting the received powers of each of the macro site and the RRH in the cell where the UE is located from the transmit power of the UE; and a third calculating module 6023, configured to calculate the path loss adjustment factor for the UE according to the transmit power differences calculated by the first calculating module 6021 and the path loss differences calculated by the second calculating module 6022.

The above embodiment merely describes a structural relationship between units/modules. For the execution method of each unit/module in practical applications, reference may be made to the method illustrated in FIG. 2, and no repeated description is given here.

In the embodiment of the present invention, the third calculating module 6023 calculates a path loss adjustment factor for a UE in a cell, and the sending unit 603 sends it to the UE. Because the path loss adjustment factor is decided by transmit power differences and path loss differences, when the UE calculates an uplink transmit power according to the path loss adjustment factor, the UE can implement calculation for path loss compensation where there are multiple power transmission points. In addition, the range of the macro site and the RRH, from which the base station obtains power parameters, can be set according to an actual need. Thereby, the embodiment of the present invention supports a macro site and an RRH that flexibly participate in uplink coordinated reception, and improves the accuracy of the UE in calculating the uplink transmit power.

Figure 8:
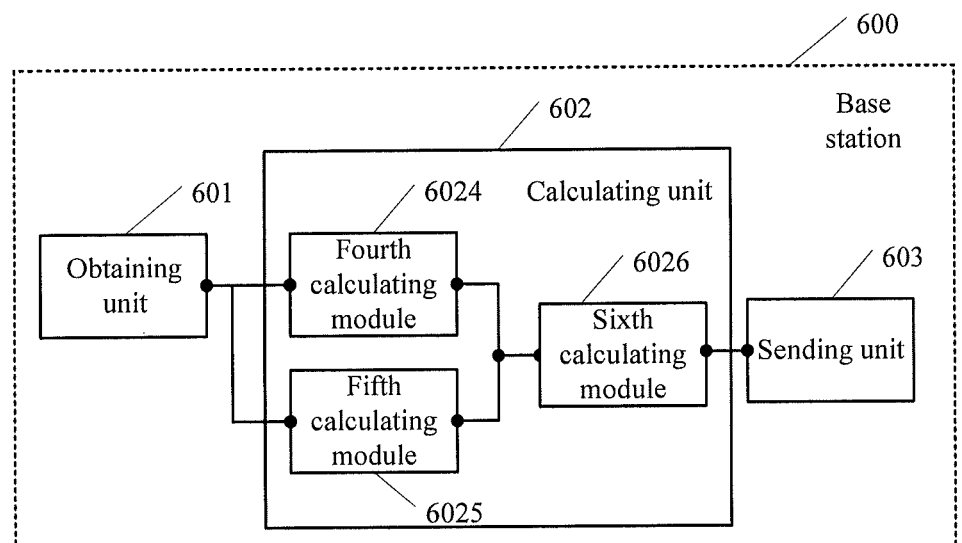
FIG. 8 is a schematic diagram of another base station according to an embodiment of the present invention.

The following uses a specific embodiment to describe the base station in the present invention. As shown in FIG. 8, the base station 600 includes: an obtaining unit 601, a calculating unit 602, and a sending unit 603.

The obtaining unit 601 is further configured to obtain a transmit power of the UE and a reference signal received power.

The power parameters obtained by the obtaining unit 601 include: transmit powers of the macro site and the RRH, received powers of the macro site and the RRH, and a reference signal power, where the reference signal power is any one transmit power among the transmit powers of the macro site and the RRH.

The calculating unit 602 includes:

a fourth calculating module 6024, configured to calculate first path losses, where the first path losses are path losses obtained by subtracting the received powers of each of the macro site and the RRH from the transmit power of the UE;

a fifth calculating module 6025, configured to calculate a second path loss, where the second path loss is a result of subtracting the reference signal received power from the reference signal power; and a sixth calculating module 6026, configured to calculate the path loss adjustment factor for the UE according to the first path losses calculated by the fourth calculating module 6024 and the second path loss calculated by the fifth calculating module 6025.

The above embodiment merely describes a structural relationship between units/modules. For the execution method of each unit/module in practical applications, reference may be made to the method illustrated in FIG. 4, and no repeated description is given here.

In the embodiment of the present invention, the sixth calculating module 6026 calculates a path loss adjustment factor for a UE in a cell, and the sending unit 603 sends it to the UE. Because the path loss adjustment factor is decided by first path losses and a second path loss, when the UE calculates an uplink transmit power according to the path loss adjustment factor, the UE can implement calculation for path loss compensation where there are multiple power transmission points. In addition, the range of the macro site and the RRH, from which the base station obtains power parameters, can be set according to an actual need. Thereby, the embodiment of the present invention supports a macro site and an RRH that flexibly participate in uplink coordinated reception, and improves the accuracy of the UE in calculating the uplink transmit power.

Figure 9:
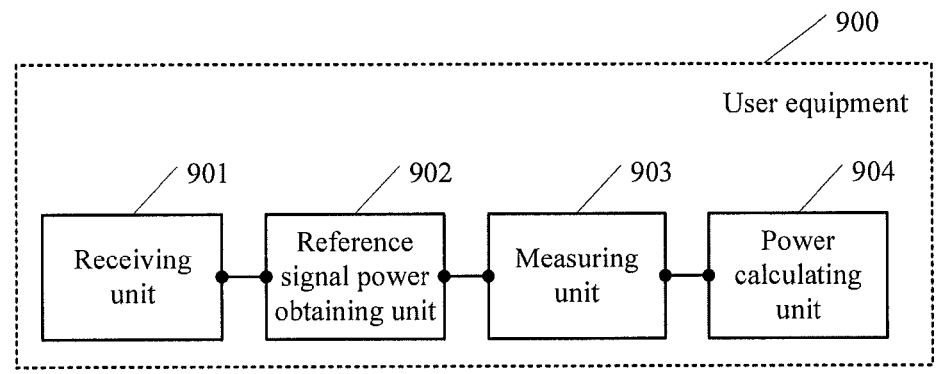
FIG. 9 is a schematic diagram of a user equipment according to an embodiment of the present invention.

As shown in FIG. 9, an embodiment of the present invention further provides a user equipment 900, including:

a receiving unit 901, configured to receive a path loss adjustment factor sent by a base station, where the path loss adjustment factor is an adjustment parameter used by the base station to compensate for an uplink transmit power of the UE; and a reference signal power obtaining unit 902, configured to obtain a reference signal power selected by the base station, where the reference signal power is any one transmit power selected by the base station among transmit powers of a macro site and an RRH in a cell where the UE is located;

a measuring unit 903, configured to measure a reference signal received power; and a power calculating unit 904, configured to calculate an uplink transmit power according to the path loss adjustment factor received by the receiving unit 901, the reference signal power obtained by the reference signal power obtaining unit 902, and the reference signal received power measured by the measuring unit 903.

The above embodiment merely describes a structural relationship between units/modules. For the execution method of each unit/module in practical applications, reference may be made to the method illustrated in FIG. 5, and no repeated description is given here.

In the embodiment of the present invention, the receiving unit 901 receives a path loss adjustment factor calculated by a base station for the UE in a cell. Because the path loss adjustment factor is calculated by the base station according to obtained power parameters of a macro site and an RRH, when the UE calculates an uplink transmit power according to the path loss adjustment factor, a reference signal power, and a reference signal received power, the calculating unit 904 can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Figure 10:
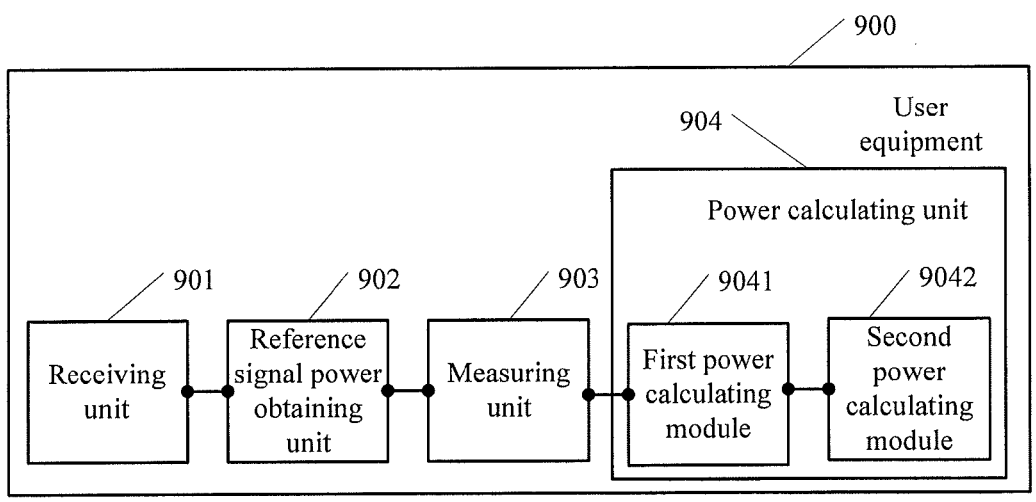
FIG. 10 is a schematic diagram of another user equipment according to an embodiment of the present invention.

The following uses a specific embodiment to describe a user equipment in the present invention. As shown in FIG. 10, the user equipment 900 includes: a receiving unit 901, a reference signal power obtaining unit 902, a measuring unit 903, and a power calculating unit 904, where, the reference signal power selected by the base station, which is obtained by the reference signal power obtaining unit 902, is referenceSignalPower;

the reference signal received power measured by the measuring unit 903 is RSRP;

the power calculating unit 904 includes: a first power calculating module 9041 and at least one of a second power calculating module 9042, a third power calculating module, and a fourth power calculating module, where, the first power calculating module 9041 is configured to calculate a target path loss $PL_c$:

$$PL_c = \text{referenceSignalPower} + 10\log_{10}(PA) - RSRP,$$

where, PA is the path loss adjustment factor;

the second power calculating module 9042 is configured to calculate an uplink transmit power of a PUSCH according to the following formula when the UE uses PUSCH mode:

$$P_{PUSCH}(i) = \min\left\{ \begin{array}{l} P_{CMAX}, \\ 10\log_{10}(M_{PUSCH}(i)) + P_{O\_PUSCH}(j) + \alpha(j) \cdot PL_C + \Delta_{TF}(i) + f(i) \end{array} \right\}$$

where, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, $\Delta_{TF}(i)$ is a power offset based on a modulation and coding scheme and a data type, and f(i) represents a closed-loop adjustment part of power control;

and/or, the third power calculating module (not illustrated in FIG. 10) is configured to calculate an uplink transmit power of a PUCCH according to the following formula when the UE uses PUCCH mode:

$$P_{PUCCH}(i) = \min \begin{cases} P_{CMAX}, \\ P_{0\_PUCCH} + PL_C + h(n_{CQI}, n_{HARQ}, n_{SR}) + \Delta_{F\_PUCCH}(F) + \Delta_{TxD}(F') + g(i) \end{cases}$$

where, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{TxD}(F')$ is a value between PUCCHs transmitted on two antenna ports, and g(i) is a PUCCH power control adjustment state factor;

and/or, the fourth power calculating module (not illustrated in FIG. 10) is configured to calculate an uplink transmit power of an SRS according to the following formula when the UE uses an SRS mode:

$$P_{SRS}(i) = \min \begin{cases} P_{CMAX}, \\ P_{SRS\_OFFSET} + 10 \log_{10}(M_{SRS}) + P_{O\_PUSCH}(j) + \alpha(j) \cdot PL_C + f(i) \end{cases}$$

where, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, and f(i) represents a closed-loop adjustment part of power control.

In the embodiment of the present invention, the receiving unit 901 receives a path loss adjustment factor calculated by a base station for the UE in a cell. Because the path loss adjustment factor is calculated by the base station according to obtained power parameters of a macro site and an RRH, when the UE calculates an uplink transmit power according to the path loss adjustment factor, a reference signal power, and a reference signal received power, the calculating unit 904 can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Figure 11:
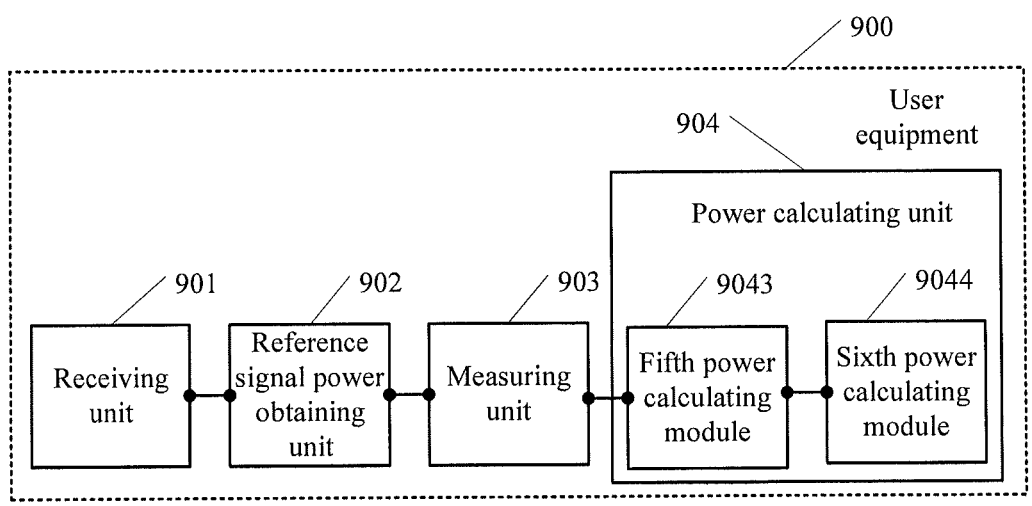
FIG. 11 is a schematic diagram of another user equipment according to an embodiment of the present invention.

The following uses a specific embodiment to describe a user equipment in the present invention. As shown in FIG. 11, the user equipment 900 includes: a receiving unit 901, a reference signal power obtaining unit 902, a measuring unit 903, and a power calculating unit 904, where, the reference signal power selected by the base station, which is obtained by the reference signal power obtaining unit 902, is referenceSignalPower;

the reference signal received power measured by the measuring unit 903 is RSRP;

the power calculating unit 904 includes: a fifth power calculating module 9043 and at least one of a sixth power calculating module 9044, a seventh power calculating module, and an eighth power calculating module, where, the fifth power calculating module 9043 is configured to calculate a target path loss $PL_c$:

$PL_c$=referenceSignalPower−RSRP, the sixth power calculating module 9044 is configured to calculate an uplink transmit power of a PUSCH according to the following formula when the UE uses PUSCH mode:

$$P_{PUSCH}(i) = \min \begin{cases} P_{CMAX}, \\ 10 \log_{10}(M_{PUSCH}(i)) + P_{O\_PUSCH}(j) + \alpha(j) \cdot (PL_C + 10 \log_{10}(PA)) + \Delta_{TF}(i) + f(i) \end{cases}$$

or, $$P_{PUSCH}(i) = \min \begin{cases} P_{CMAX}, \\ 10 \log_{10}(M_{PUSCH}(i)) + P_{O\_PUSCH}(j) + \beta \cdot \alpha(j) \cdot PL_C + \Delta_{TF}(i) + f(i) \end{cases},$$

$\beta = (PL_C + 10 \log_{10}(PA))/PL_C$ or, $$P_{PUSCH}(i) = \min \begin{cases} P_{CMAX}, \\ 10 \log_{10}(M_{PUSCH}(i)) + P_{O\_PUSCH}(j) + \gamma \cdot PL_C + \Delta_{TF}(i) + f(i) \end{cases},$$

$\gamma = \alpha(j) \cdot (PL_C + 10 \log_{10}(PA))/PL_C$ where, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, PA is the path loss adjustment factor, $\Delta_{TF}(i)$ is a power offset based on a modulation and coding scheme and a data type, and f(i) represents a closed-loop adjustment part of power control;

The seventh power calculating module (not illustrated in FIG. 11) is configured to calculate uplink transmit power of a PUCCH according to the following formula when the UE uses PUCCH mode:

$$P_{PUCCH}(i) = \min\begin{cases} P_{CMAX}, \\ P_{0\_PUCCH} + PL_C + 10\,log_{10}(PA) + h(n_{CQI}, n_{HARQ}, n_{SR}) + \Delta_{F\_PUCCH}(F) + \Delta_{TxD}(F') + g(i) \end{cases}$$

where, i represents a subframe, $P_{CMAX}$ represents a maximum allowed power, $P_{O\_PUSCH}$ is a nominal power that is semi-statically set by the base station for all UEs in the cell, $PL_c$ is the target path loss, PA is the path loss adjustment factor, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{TxD}(F')$ is a value of a PUCCH transmitted on two antenna ports, and g(i) is a PUCCH power control adjustment state factor; and the eighth power calculating module (not illustrated in FIG. 11) is configured to calculate uplink transmit power of an SRS according to the following formula when the UE uses an SRS mode:

$$P_{SRS}(i) = \min\begin{cases} P_{CMAX}, \\ P_{SRS\_OFFSET} + 10\,log_{10}(M_{SRS}) + P_{O\_PUSCH}(j) + \alpha(j) \cdot (PL_C + 10\,log_{10}(PA)) + f(i) \end{cases}$$

or, $$P_{SRS}(i) = \min\begin{cases} P_{CMAX}, \\ P_{SRS\_OFFSET} + 10\,log_{10}(M_{SRS}) + P_{O\_PUSCH}(j) + \beta \cdot \alpha(j) \cdot PL_C + f(i) \end{cases},$$

$$\beta = (PL_C + 10\,log_{10}(PA))/PL_C$$

or, $$P_{SRS}(i) = \min\begin{cases} P_{CMAX}, \\ P_{SRS\_OFFSET} + 10\,log_{10}(M_{SRS}) + P_{O\_PUSCH}(j) + \gamma \cdot PL_C + f(i) \end{cases},$$

$$\gamma = \alpha(j) \cdot (PL_C + 10\,log_{10}(PA))/PL_C$$

where, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, PA is the path loss adjustment factor, and f(i) represents a closed-loop adjustment part of power control.

In the embodiment of the present invention, the receiving unit 901 receives a path loss adjustment factor calculated by a base station for the UE in a cell. Because the path loss adjustment factor is calculated by the base station according to obtained power parameters of a macro site and an RRH, when the UE calculates an uplink transmit power according to the path loss adjustment factor, a reference signal power, and a reference signal received power, the calculating unit 904 can implement calculation for path loss compensation where there are multiple power transmission points. In addition, the range of the macro site and the RRH, from which the base station obtains the power parameters, can be set according to an actual need. Thereby, the embodiment of the present invention supports a macro site and an RRH that flexibly participate in uplink coordinated reception, and improves the accuracy of the UE in calculating the uplink transmit power.

Persons of ordinary skill in the art understand that all or a part of the steps of the method in the embodiments may be implemented by a computer program instructing relevant hardware. The program may be stored in a computer readable storage medium such as a read-only memory, a magnetic disk, an optical disk, or the like.

The foregoing has described a path loss compensation method, a base station, and a user equipment according to the embodiments of the present invention in detail. Persons of ordinary skill in the art can make modifications with respect to the specific implementation manner and the application scope according to the ideas of the embodiments of the present invention, and the content herein shall not be construed as a limitation on the present invention.

What is claimed is:

1. A path loss compensation method, comprising:
   obtaining, by a base station, power parameters of a macro site and at least one remote radio head (RRH) in a cell where a user equipment (UE) is located, the macro site and the at least one RRH forming a distributed antenna system (DAS);
   calculating, by the base station, a path loss adjustment factor for the UE according to the power parameters, wherein the path loss adjustment factor is an adjustment parameter used by the base station to compensate for an uplink transmit power of the UE; and
   sending, by the base station, the path loss adjustment factor to the UE, so that the UE can calculate the uplink transmit power according to the path loss adjustment factor, wherein:
   the power parameters comprise: transmit powers of the macro site and the RRH, a reference signal power, and received powers of the macro site and the RRH, wherein the reference signal power is any one transmit power among the transmit powers of the macro site and the RRH; and
   the calculating, by the base station, the path loss adjustment factor for the UE according to the power parameters, comprises:
      calculating, by the base station, transmit power differences, wherein the transmit power differences are differences between each of the transmit powers of the macro site and the RRH and the reference signal power;

calculating, by the base station, path loss differences, wherein the path loss differences are path losses obtained by subtracting path losses between the UE and each of the macro site and the RRH in the cell where the UE is located from a path loss between the UE and each of a macro site or an RRH whose transmit power is selected as the reference signal power, wherein the path losses between the UE and each of the macro site and the RRH in the cell where the UE is located are received powers obtained by subtracting each of the received powers of the macro site and the RRH in the cell where the UE is located from the transmit power of the UE; and calculating, by the base station, the path loss adjustment factor for the UE according to the transmit power differences and the path loss differences.

2. The path loss compensation method according to claim 1, wherein:

the reference signal power is $P_0$, the transmit power difference is $\alpha_i$, wherein $\alpha_i = P_i - P_0$, $\alpha_0 = 0$, and $P_i$ is a transmit power of the $i^{th}$ macro site or RRH;

the path loss difference is $\beta_i$, wherein $\beta_i = PL_0 - PL_i$, $\beta_0 = 0$, $PL_0$ is a path loss between the UE and each of the macro site or the RRH whose transmit power is selected as the reference signal power $P_0$, and $PL_i$ is a path loss between the UE and the macro site or RRH whose transmit power is $P_i$;

the path loss adjustment factor calculated by the base station for the UE according to the transmit power differences and the path loss differences is PA, $$PA = \left(\sum_{i=0}^{N-1} 10^{\frac{(\alpha_i+\beta_i)}{10}}\right) / \sum_{i \in R} 10^{\frac{\beta_i}{10}}$$

wherein N is the number of the macro site and RRH, and R is a set of a macro site and an RRH that actually participate in uplink coordinated reception.

3. The path loss compensation method according to claim 2, wherein: when all the macro site and the RRH actually participate in uplink coordinated reception, R={0, 1, ..., N−1}, and the path loss adjustment factor is:

$$PA = \left(\sum_{i=0}^{N-1} 10^{\frac{(\alpha_i+\beta_i)}{10}}\right) / \sum_{i=0}^{N-1} 10^{\frac{\beta_i}{10}}.$$

4. The path loss compensation method according to claim 3, wherein, when the reference signal power $P_0$ is the transmit power of the macro site, a value range of the path loss adjustment factor PA is from 0 to 1.

5. The path loss compensation method according to claim 1, wherein:

the power parameters comprise: transmit powers of the macro site and the RRH, received powers of the macro site and the RRH, and a reference signal power, wherein the reference signal power is any one transmit power among the transmit powers of the macro site and the RRH;

before the calculating, by the base station, a path loss adjustment factor for the UE, the method further comprises: obtaining, by the base station, a transmit power of the UE and a reference signal received power; and the calculating, by the base station, a path loss adjustment factor for the UE according to the power parameters, comprises:

calculating, by the base station, first path losses, wherein the first path losses are path losses obtained by subtracting the received powers of each of the macro site and the RRH from the transmit power of the UE;

calculating, by the base station, a second path loss, wherein the second path loss is a result of subtracting the reference signal received power from the reference signal power; and calculating, by the base station, the path loss adjustment factor for the UE according to the first path losses and the second path loss.

6. The path loss compensation method according to claim 5, wherein:

the first path loss is $PL_i = P_c - P_{ri}$, wherein $P_c$ is the transmit power of the UE, and $P_{ri}$ is a received power of an $i^{th}$ macro site or RRH;

the second path loss is $PL_0 = P_0 - RSRP$, wherein $P_0$ is the reference signal power, and RSRP is the reference signal received power; and the path loss adjustment factor is PA, $$PA = 10^{\frac{(\Sigma_{i \in R} PL_i) - PL_0}{10}}$$

wherein, R is a set of a macro site and an RRH that actually participate in uplink coordinated reception.

7. A path loss compensation method, comprising:

receiving, by a user equipment (UE), a path loss adjustment factor sent by a base station, wherein the path loss adjustment factor is an adjustment parameter used by the base station to compensate for an uplink transmit power of the UE;

obtaining, by the UE, a reference signal power selected by the base station, wherein the reference signal power is any one transmit power selected by the base station among transmit powers of a macro site and at least one remote radio head (RRH) in a cell where the UE is located, the macro site and the at least one RRH forming a distributed antenna system (DAS);

measuring, by the UE, a reference signal received power; and calculating, by the UE, an uplink transmit power according to the path loss adjustment factor, the reference signal power, and the reference signal received power, wherein:

the path loss adjustment factor sent by the base station is calculated according to power parameters of the macro site and the at least one RRH, the power parameters comprise: transmit powers of the macro site and the RRH, a reference signal power, and received powers of the macro site and the RRH, wherein the reference signal power is any one transmit power among the transmit powers of the macro site and the RRH; and the calculation by the base station of the path loss adjustment factor for the UE according to the power parameters, comprises:

calculating, by the base station, transmit power differences, wherein the transmit power differences are differences between each of the transmit powers of the macro site and the RRH and the reference signal power; and calculating, by the base station, path loss differences, wherein the path loss differences are path losses obtained by subtracting path losses between the UE and each of the macro site and the RRH in the cell where the UE is located from a path loss between the UE and each of a macro site or an RRH whose transmit power is selected as the reference signal power, wherein the path losses between the UE and each of the macro site and the RRH in the cell where the UE is located are received powers obtained by subtracting each of the received powers of the macro site and the RRH in the cell where the UE is located from the transmit power of the UE; and calculating, by the base station, the path loss adjustment factor for the UE according to the transmit power differences and the path loss differences.

8. The path loss compensation method according to claim 7, wherein:

the reference signal power selected by the base station, which is obtained by the UE, is referenceSignalPower;

the reference signal received power measured by the UE is RSRP; and the calculating, by the UE, an uplink transmit power according to the path loss adjustment factor, the reference signal power, and the reference signal received power, comprises:

calculating, by the UE, a target path loss $PL_c$:

$$PL_c = \text{referenceSignalPower} + 10\log_{10}(PA) - RSRP,$$

wherein, PA is the path loss adjustment factor; and when the UE uses a physical uplink shared channel PUSCH mode, calculating, by the UE, an uplink transmit power of a PUSCH according to the following formula:

$$P_{PUSCH}(i) = \min\left\{ \begin{array}{l} P_{CMAX}, \\ 10\log_{10}(M_{PUSCH}(i)) + P_{O\_PUSCH}(j) + \alpha(j) \cdot PL_C + \Delta_{TF}(i) + f(i) \end{array} \right\},$$

wherein, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, $\Delta_{TF}(i)$ is a power offset based on a modulation and coding scheme and a data type, and f(i) represents a closed-loop adjustment part of power control;

and/or, when the UE uses a physical uplink control channel PUCCH mode, calculating, by the UE, an uplink transmit power of a PUCCH according to the following formula:

$$P_{PUCCH}(i) = \min\left\{ \begin{array}{l} P_{CMAX}, \\ P_{0\_PUCCH} + PL_C + h(n_{CQI}, n_{HARQ}, n_{SR}) + \Delta_{F\_PUCCH}(F) + \Delta_{TxD}(F') + g(i) \end{array} \right\},$$

wherein, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{TxD}(F')$ is a power deviation between PUCCHs transmitted on two antenna ports, and g(i) is a PUCCH power control adjustment state factor;

and/or, when the UE uses a sounding reference signal SRS mode, calculating, by the UE, an uplink transmit power of an SRS according to the following formula:

$$P_{SRS}(i) = \min\left\{ \begin{array}{l} P_{CMAX}, \\ P_{SRS\_OFFSET} + 10\log_{10}(M_{SRS}) + P_{O\_PUSCH}(j) + \alpha(j) \cdot PL_C + f(i) \end{array} \right\},$$

wherein, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, and f(i) represents a closed-loop adjustment part of power control;

wherein, when the UE uses the PUSCH mode, the PUCCH mode, or the SRS mode, a value range of the PA varies.

9. The path loss compensation method according to claim 7, wherein:

the reference signal power selected by the base station, which is obtained by the UE, is referenceSignalPower;

the reference signal received power measured by the UE is RSRP; and the calculating, by the UE, uplink transmit power according to the path loss adjustment factor, the reference signal power, and the reference signal received power, comprises:

calculating, by the UE, a target path loss $PL_c$:

$$PL_c = \text{referenceSignalPower} - RSRP, \text{ and}$$

when the UE uses PUSCH mode, calculating, by the UE, uplink transmit power of a PUSCH according to the following formula:

$$P_{PUSCH}(i) = \min\left\{ \begin{array}{l} P_{CMAX}, \\ 10\log_{10}(M_{PUSCH}(i)) + P_{O\_PUSCH}(j) + \alpha(j) \cdot (PL_C + 10\log_{10}(PA)) + \Delta_{TF}(i) + f(i) \end{array} \right\},$$

or, $$P_{PUSCH}(i) = \min\left\{ \begin{array}{l} P_{CMAX}, \\ 10\log_{10}(M_{PUSCH}(i)) + P_{O\_PUSCH}(j) + \beta \cdot \alpha(j) \cdot PL_C + \Delta_{TF}(i) + f(i) \end{array} \right\},$$

$$\beta = (PL_C + 10\log_{10}(PA))/PL_C$$

or, $$P_{PUSCH}(i) = \min\begin{cases} P_{CMAX}, \\ 10\log_{10}(M_{PUSCH}(i)) + P_{O\_PUSCH}(j) + \gamma \cdot PL_C + \Delta_{TF}(i) + f(i) \end{cases},$$

$$\gamma = \alpha(j) \cdot (PL_C + 10\log_{10}(PA))/PL_C$$

wherein, i represents a subframe, j represents a type of a, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, PA is the path loss adjustment factor, $\Delta_{TF}(i)$ is a power offset based on a modulation and coding scheme and a data type, and f(i) represents a closed-loop adjustment part of power control.

10. The path loss compensation method according to claim 7, wherein:
the reference signal power selected by the base station, which is obtained by the UE, is referenceSignalPower;
the reference signal received power measured by the UE is RSRP; and
the calculating, by the UE, uplink transmit power according to the path loss adjustment factor, the reference signal power, and the reference signal received power, comprises:
calculating, by the UE, a target path loss $PL_c$:

$PL_c$=referenceSignalPower−RSRP, and when the UE uses a PUCCH mode, calculating, by the UE, uplink transmit power of a PUCCH according to the following formula:

$$P_{PUCCH}(i) = \min\begin{cases} P_{CMAX}, \\ P_{0\_PUCCH} + PL_C + 10\log_{10}(PA) + h(n_{CQI}, n_{HARQ}, n_{SR}) + \Delta_{F\_PUCCH}(F) + \Delta_{T \times D}(F') + g(i) \end{cases},$$

wherein, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, PA is the path loss adjustment factor, $n_{CQI}$ is the number of bits of channel quality information, $n_{HARQ}$ is the number of bits of a hybrid automatic repeat request, $n_{SR}$ is the number of bits of a scheduling request, $h(n_{CQI},n_{HARQ},n_{SR})$ is a value based on a PUCCH format, F and F' are PUCCH formats, $\Delta_{F\_PUCCH}(F)$ is a value of PUCCH format F relative to PUCCH format 1a, $\Delta_{T \times D}(F')$ is a value between PUCCHs transmitted on two antenna ports, and g(i) is a PUCCH power control adjustment state factor.

11. The path loss compensation method according to claim 7, wherein:

the reference signal power selected by the base station, which is obtained by the UE, is referenceSignalPower;

the reference signal received power measured by the UE is RSRP; and the calculating, by the UE, uplink transmit power according to the path loss adjustment factor, the reference signal power, and the reference signal received power, comprises:

calculating, by the UE, a target path loss $PL_c$:

$PL_c$=referenceSignalPower−RSRP, and when the UE uses an SRS mode, calculating, by the UE, an uplink transmit power of an SRS according to the following formula:

$$P_{SRS}(i) = \min\begin{cases} P_{CMAX}, \\ P_{SRS\_OFFSET} + 10\log_{10}(M_{SRS}) + P_{O\_PUSCH}(j) + \alpha(j) \cdot (PL_C + 10\log_{10}(PA)) + f(i) \end{cases},$$

or, $$P_{SRS}(i) = \min\begin{cases} P_{CMAX}, \\ P_{SRS\_OFFSET} + 10\log_{10}(M_{SRS}) + P_{O\_PUSCH}(j) + \beta \cdot \alpha(j) \cdot PL_C + f(i) \end{cases},$$

$$\beta = (PL_C + 10\log_{10}(PA))/PL_C$$

or, $$P_{SRS}(i) = \min\begin{cases} P_{CMAX}, \\ P_{SRS\_OFFSET} + 10\log_{10}(M_{SRS}) + P_{O\_PUSCH}(j) + \gamma \cdot PL_C + f(i) \end{cases},$$

$$\gamma = \alpha(j) \cdot (PL_C + 10\log_{10}(PA))/PL_C$$

wherein, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, PA is the path loss adjustment factor, and f(i) represents a closed-loop adjustment part of power control.

12. A base station, comprising:
at least one hardware processor configured to:
  obtain power parameters of a macro site and at least one remote radio head (RRH) in a cell where a user equipment (UE) is located, the macro site and the at least one RRH forming a distributed antenna system (DAS);
  calculate a path loss adjustment factor for the UE according to the power parameters, wherein the path loss adjustment factor is an adjustment parameter used by the base station to compensate for an uplink transmit power of the UE; and
a transmitter, configured to send the path loss adjustment factor to the UE, so that the UE can calculate the uplink transmit power according to the path loss adjustment factor, wherein:
the power parameters comprise: transmit powers of the macro site and the RRH, a reference signal power, and received powers of the macro site and the RRH, wherein the reference signal power is any one transmit power among the transmit powers of the macro site and the RRH; and
the at least one hardware processor is further configured to:
  calculate transmit power differences, wherein the transmit power differences are differences between each of the transmit powers of the macro site and the RRH and the reference signal power;
  calculate path loss differences, wherein the path loss differences are path losses obtained by subtracting path losses between the UE and each of the macro site and the RRH in the cell where the UE is located from a path loss between the UE and a macro site or an RRH whose transmit power is selected as the reference signal power, wherein the path losses between the UE and each of the macro site and the RRH in the cell where the UE is located are received powers obtained by subtracting each of the received powers of the macro site and the RRH in the cell where the UE is located from the transmit power of the UE; and
  calculate the path loss adjustment factor for the UE according to the transmit power differences and the path loss differences.

13. The base station according to claim 12, wherein:
the power parameters comprise: transmit powers of the macro site and the RRH, received powers of the macro site and the RRH, and reference signal power, wherein the reference signal power is any one transmit power among the transmit powers of the macro site and the RRH;
the at least one hardware processor is further configured to:
  obtain a transmit power of the UE and a reference signal received power; and
  calculate first path losses, wherein the first path losses are path losses obtained by subtracting the received powers of each of the macro site and the RRH from the transmit power of the UE;
  calculate a second path loss, wherein the second path loss is a result of subtracting the reference signal received power from the reference signal power; and
  calculate the path loss adjustment factor for the UE according to the first path losses and the second path loss.

14. A user equipment (UE), comprising:
a receiver, configured to receive a path loss adjustment factor sent by a base station, wherein the path loss adjustment factor is an adjustment parameter used by the base station to compensate for an uplink transmit power of the UE; and
at least one hardware processor, configured to:
obtain a reference signal power selected by the base station, wherein the reference signal power is any one transmit power selected by the base station among transmit powers of a macro site and at least one remote radio head (RRH) in a cell where the UE is located, the macro site and the at least one RRH forming a distributed antenna system (DAS);
measure a reference signal received power; and
calculate an uplink transmit power according to the path loss adjustment factor received by the receiver, the reference signal power, and the reference signal received power, wherein:
the path loss adjustment factor sent by the base station is calculated according to power parameters of the macro site and the at least one RRH,
the power parameters comprise: transmit powers of the macro site and the RRH, a reference signal power, and received powers of the macro site and the RRH, wherein the reference signal power is any one transmit power among the transmit powers of the macro site and the RRH; and
the calculation of the path loss adjustment factor for the UE according to the power parameters, comprises:
  calculating, by the base station, transmit power differences, wherein the transmit power differences are differences between each of the transmit powers of the macro site and the RRH and the reference signal power; and
  calculating, by the base station, path loss differences, wherein the path loss differences are path losses obtained by subtracting path losses between the UE and each of the macro site and the RRH in the cell where the UE is located from a path loss between the UE and a macro site or an RRH whose transmit power is selected as the reference signal power, wherein the path losses between the UE and each of the macro site and the RRH in the cell where the UE is located are received powers obtained by subtracting each of the received powers of the macro site and the RRH in the cell where the UE is located from the transmit power of the UE; and
  calculating, by the base station, the path loss adjustment factor for the UE according to the transmit power differences and the path loss differences.

15. The user equipment according to claim 14, wherein the reference signal power selected by the base station is referenceSignalPower;
wherein the reference signal received power is RSRP;
wherein the at least one hardware processor is further configured to implement: a first power calculating module and at least one of a second power calculating module, a third power calculating module, and a fourth power calculating module;

wherein, the first power calculating module is configured to calculate a target path loss $PL_c$:

$PL_c$=referenceSignalPower+10 $\log_{10}(PA)$−RSRP, wherein, PA is the path loss adjustment factor;

the second power calculating module is configured to, when the UE uses a physical uplink shared channel PUSCH mode, calculate an uplink transmit power of a PUSCH according to the following formula:

$$P_{PUSCH}(i) = \min\begin{Bmatrix} P_{CMAX}, \\ 10\log_{10}(M_{PUSCH}(I)) + P_{O\_PUSCH}(j) + \alpha(j) \cdot PL_C + \Delta_{TF}(i) + f(i) \end{Bmatrix},$$

wherein, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, $\alpha(j)$ is a path loss compensation factor, $PL_c$ is the target path loss, $\Delta_{TF}(i)$ is a power offset based on a modulation and coding scheme and a data type, and f(i) represents a closed-loop adjustment part of power control;

the third power calculating module is configured to, when the UE uses a physical uplink control channel PUCCH mode, calculate an uplink transmit power of a PUCCH according to the following formula:

$$P_{PUCCH}(i) = \min\begin{Bmatrix} P_{CMAX}, \\ P_{0\_PUCCH} + PL_C + h(n_{CQI}, n_{HARQ}, n_{SR}) + \Delta_{F\_PUCCH}(F) + \Delta_{T \times D}(F') + g(i) \end{Bmatrix},$$

wherein, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{T \times D}(F')$ is a value between PUCCHs transmitted on two antenna ports, and g(i) is a PUCCH power control adjustment state factor; and the fourth power calculating module is configured to, when the UE uses a sounding reference signal SRS mode, calculate an uplink transmit power of an SRS according to the following formula:

$$P_{SRS}(i) = \min\begin{Bmatrix} P_{CMAX}, \\ P_{SRS,OFFSET} + 10\log_{10}(M_{SRS}) + P_{O\_PUSCH}(j) + \alpha(j) \cdot PL_C + f(i) \end{Bmatrix},$$

wherein, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, and f(i) represents a closed-loop adjustment part of power control.

16. The user equipment according to claim 14, wherein:

the reference signal power selected by the base station is referenceSignalPower;

the reference signal received power is RSRP; and the at least one hardware processor is further configured to implement a fifth power calculating module and a sixth power calculating module, wherein, the fifth power calculating module is configured to calculate a target path loss $PL_c$:

$PL_c$=referenceSignalPower−RSRP, and the sixth power calculating module is configured to, when the UE uses a PUSCH mode, calculate and uplink transmit power of a PUSCH according to the following formula:

$$P_{PUSCH}(i) = \min\begin{Bmatrix} P_{CMAX}, \\ 10\log_{10}(M_{PUSCH}(i)) + P_{O\_PUSCH}(j) + \alpha(j) \cdot (PL_C + 10\log_{10}(PA)) + \Delta_{TF}(i) + f(i) \end{Bmatrix},$$

or, $$P_{PUSCH}(i) = \min\begin{Bmatrix} P_{CMAX}, \\ 10\log_{10}(M_{PUSCH}(i)) + P_{O\_PUSCH}(j) + \beta \cdot \alpha(j) \cdot PL_C + \Delta_{TF}(i) + f(i) \end{Bmatrix},$$

$\beta = (PL_C + 10\log_{10}(PA))/PL_C$ or, $$P_{PUSCH}(i) = \min\begin{Bmatrix} P_{CMAX}, \\ 10\log_{10}(M_{PUSCH}(i)) + P_{O\_PUSCH}(j) + \gamma \cdot PL_C + \Delta_{TF}(i) + f(i) \end{Bmatrix},$$

$\gamma = \alpha(j) \cdot (PL_C + 10\log_{10}(PA))/PL_C$ wherein, i represents a subframe, j represents a type of a packet in the cell, $P_{CMAX}$ represents a maximum allowed power, $M_{PUSCH}(i)$ is a PUSCH transmission bandwidth, $P_{O\_PUSCH}(j)$ is a nominal power that is semi-statically set by the base station for all UEs in the cell, α(j) is a path loss compensation factor, $PL_c$ is the target path loss, PA is the path loss adjustment factor, $\Delta_{TF}(i)$ is a power offset based on a modulation and coding scheme and a data type, and f(i) represents a closed-loop adjustment part of power control.

17. The user equipment according to claim 14, wherein:

the reference signal power selected by the base station is referenceSignalPower;

the reference signal received power is RSRP; and the at least one hardware processor is further configured to implement a fifth power calculating module and a seventh power calculating module, wherein, the fifth power calculating module is configured to calculate a target path loss $PL_c$:

$PL_c$=referenceSignalPower−RSRP, and the seventh power calculating module is configured to, when the UE uses a PUCCH mode, calculate an uplink transmit power of a PUCCH according to the following formula:

$$P_{PUCCH}(i) = \min\left\{\begin{array}{l} P_{CMAX}, \\ P_{0\_PUCCH} + PL_C + 10\log_{10}(PA) + h(n_{CQI}, n_{HARQ}, n_{SR}) + \Delta_{F\_PUCCH}(F) + \Delta_{T \times D}(F') + g(i) \end{array}\right\},$$

wherein, i represents a subframe, $P_{CMAX}$ represents a maximum allowed power, $P_{O\_PUSCH}(j)$ is a nominal power that is semi-statically set by the base station for all UEs in the cell, $PL_c$ is the target path loss, PA is the path loss adjustment factor, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a value of PUCCH format F relative to PUCCH format 1a, $\Delta_{T \times D}(F')$ is a value between PUCCHs transmitted on two antenna ports, and g(i) is a PUCCH power control adjustment state factor.

18. The user equipment according to claim 14, wherein:

the reference signal power selected by the base station is referenceSignalPower;

the reference signal received power is RSRP; and the at least one hardware processor is further configured to implement a fifth power calculating module and an eighth power calculating module, wherein, the fifth power calculating module is configured to calculate a target path loss $PL_c$:

$PL_c$=referenceSignalPower−RSRP, and the eighth power calculating module is configured to, when the UE uses an SRS mode, calculate an uplink transmit power of an SRS according to the following formula:

$$P_{SRS}(i) = \min\left\{\begin{array}{l} P_{CMAX}, \\ P_{SRS\_OFFSET} + 10\log_{10}(M_{SRS}) + P_{O\_PUSCH}(j) + \alpha(j) \cdot (PL_C + 10\log_{10}(PA)) + f(i) \end{array}\right\},$$

or, $$P_{SRS}(i) = \min\left\{\begin{array}{l} P_{CMAX}, \\ P_{SRS\_OFFSET} + 10\log_{10}(M_{SRS}) + P_{O\_PUSCH}(j) + \beta \cdot \alpha(j) \cdot PL_C + f(i) \end{array}\right\},$$

$\beta = (PL_C + 10\log_{10}(PA))/PL_C$ or, $$P_{SRS}(i) = \min\left\{\begin{array}{l} P_{CMAX}, \\ P_{SRS\_OFFSET} + 10\log_{10}(M_{SRS}) + P_{O\_PUSCH}(j) + \gamma \cdot PL_C + f(i) \end{array}\right\},$$

$\gamma = \alpha(j) \cdot (PL_C + 10\log_{10}(PA))/PL_C$ wherein, i represents a subframe, $P_{CMAX}$ represents a maximum allowed power, $P_{SRS\_OFFSET}$ represents an SRS transmit power offset, $M_{SRS}$ represents an SRS bandwidth, $P_{O\_PUSCH}(j)$ represents a nominal power that is semi-statically set by the base station for all UEs in the cell, $\alpha(j)$ is a path loss compensation factor, $PL_c$ is the target path loss, PA is the path loss adjustment factor, and f(i) represents a closed-loop adjustment part of power control.

* * * * *